United States Patent
Tsuzuki

(10) Patent No.: US 8,736,890 B2
(45) Date of Patent: May 27, 2014

(54) COPIER CONFIGURED TO COPY AN IMAGE AND DATA STORED IN A STORAGE MEDIUM OF AN ORIGINAL DOCUMENT BASED ON SELECTION MODES

(75) Inventor: Toru Tsuzuki, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 300 days.

(21) Appl. No.: 12/644,767

(22) Filed: Dec. 22, 2009

(65) Prior Publication Data

US 2010/0157392 A1  Jun. 24, 2010

(30) Foreign Application Priority Data

Dec. 24, 2008  (JP) .................................. 2008-328617

(51) Int. Cl.
*G06K 15/00*  (2006.01)
(52) U.S. Cl.
USPC ............ 358/1.18; 358/1.14; 358/1.1; 358/1.6
(58) Field of Classification Search
CPC ................ H04N 1/00342; G03G 2215/00299; G03G 2215/00932; G03G 15/5016
USPC .......... 358/1.1–1.9, 1.11–1.18, 3.28
See application file for complete search history.

(56) References Cited

U.S. PATENT DOCUMENTS

| | | | |
|---|---|---|---|
| 7,273,165 B2 | 9/2007 | Satake et al. | |
| 7,847,958 B2 * | 12/2010 | Ishikura | 358/1.14 |
| 7,889,360 B2 * | 2/2011 | Kiwada | 358/1.12 |
| 8,154,769 B2 | 4/2012 | McFarland et al. | |
| 8,164,771 B2 | 4/2012 | Hikichi et al. | |
| 8,189,214 B2 | 5/2012 | Ishii | |
| 8,243,301 B2 | 8/2012 | Ogura et al. | |
| 2002/0170973 A1 | 11/2002 | Teraura | |
| 2004/0046999 A1 | 3/2004 | Watanabe et al. | |
| 2004/0194133 A1 * | 9/2004 | Ikeda et al. | 725/37 |
| 2005/0029353 A1 | 2/2005 | Isemura et al. | |
| 2005/0105920 A1 | 5/2005 | Matsunaga | |
| 2005/0111867 A1 | 5/2005 | Hatano | |
| 2005/0133707 A1 * | 6/2005 | Ichiyanagi | 250/234 |

(Continued)

FOREIGN PATENT DOCUMENTS

CN   200910224962.4   2/2012
EP   09252439.6-1522   1/2010

(Continued)

OTHER PUBLICATIONS

Extended European Search Report dated Jan. 25, 2011.

(Continued)

*Primary Examiner* — Benny Q Tieu
*Assistant Examiner* — Quyen V Ngo
(74) *Attorney, Agent, or Firm* — Scully, Scott, Murphy & Presser PC

(57) ABSTRACT

A copier is provided. The copier is configured to copy an image of an original document, which has a storage medium, and the storage medium, wherein a process of copying the original document, which has the storage medium, has three operation modes (A), (B), and (C) of (A) copying the storage medium and the image of the original document, (B) copying only the storage medium, and (C) copying only the image of the original document. Further, the copier has a selection unit that selects an operation mode to be performed among the operation modes.

17 Claims, 16 Drawing Sheets

(56) References Cited

U.S. PATENT DOCUMENTS

| | | | |
|---|---|---|---|
| 2006/0028667 A1* | 2/2006 | Saito .................... | 358/1.13 |
| 2006/0082818 A1 | 4/2006 | Kasamatsu et al. | |
| 2006/0098901 A1 | 5/2006 | Hino | |
| 2006/0215228 A1 | 9/2006 | Inaba | |
| 2006/0275064 A1 | 12/2006 | Minari | |
| 2007/0157826 A1 | 7/2007 | Mestres et al. | |
| 2007/0194098 A1 | 8/2007 | Nakata et al. | |
| 2007/0216939 A1* | 9/2007 | Wada et al. .......... | 358/1.15 |
| 2007/0274753 A1 | 11/2007 | Muto | |
| 2008/0037034 A1 | 2/2008 | Ishii | |
| 2008/0074695 A1 | 3/2008 | Ikeno et al. | |
| 2008/0082914 A1 | 4/2008 | Ueno et al. | |
| 2008/0266602 A1 | 10/2008 | Moriyama et al. | |
| 2009/0251721 A1 | 10/2009 | Knodt et al. | |

FOREIGN PATENT DOCUMENTS

| | | | |
|---|---|---|---|
| JP | 2002-337426 | | 11/2002 |
| JP | 2004-142420 | | 5/2004 |
| JP | 2005-028673 | A | 2/2005 |
| JP | 2005-53077 | | 3/2005 |
| JP | 2005-197831 | | 7/2005 |
| JP | 2005204177 | | 7/2005 |
| JP | 2005-238532 | | 9/2005 |
| JP | 2005-265902 | | 9/2005 |
| JP | 2006-5544 | | 1/2006 |
| JP | 2006-103284 | | 4/2006 |
| JP | 2006-110802 | | 4/2006 |
| JP | 2006-135444 | A | 5/2006 |
| JP | 2006-143436 | | 6/2006 |
| JP | 2006229717 | A * | 8/2006 |
| JP | 2006-317526 | | 11/2006 |
| JP | 2006-352330 | | 12/2006 |
| JP | 2007-006316 | | 1/2007 |
| JP | 2007-60220 | | 3/2007 |
| JP | 2007-88720 | | 4/2007 |
| JP | 2007-225724 | | 9/2007 |
| JP | 2005-117571 | | 4/2008 |
| JP | 2008-76851 | | 4/2008 |
| JP | 2008-090340 | A | 4/2008 |
| JP | 2009295106 | | 12/2009 |
| JP | 2008-300537 | | 4/2011 |

OTHER PUBLICATIONS

Japanese Office Action issued Nov. 5, 2010 corresponding to Japanese Patent Application No. 2008-328617.
Chinese Official Action dated Feb. 13, 2012 together with an English translation from related Chinese patent Application No. 200910262220.0.
Japanese Office Action dated Sep. 9, 2010 received in related U.S. Appl. No. 12/579,764.
European Search Report dated Jan. 29, 2010 received from related case EP 09252439.6-1522.
Chinese Office Action dated Feb. 7, 2012 from related Chinese Application No. 200910224962.4, together with an English language.
U.S. Official Action dated Aug. 22, 2012 in related U.S. Appl. No. 12/579,764.
Office Action dated Jun. 24, 2013 received in related case, namely, U.S. Appl. No. 12/579,764.
Notice of Allowance dated Dec. 4, 2013 received in related case U.S. Appl. No. 12/579,764.
European Office Action dated Dec. 6, 2013 received in corresponding European Patent application No. 9252439.6.
U.S. Office Action dated Dec. 5, 2012 received in related case, namely, U.S. Appl. No. 12/579,764.
U.S. Office Action dated Aug. 22, 2012 received in related case, namely, U.S. Appl. No. 12/579,764.
Japanese Office Action dated Apr. 5, 2011 together with an English language translation from JP 2008-300537.
European Office Action dated Dec. 7, 2010 received in related case EP 09252439.6.

* cited by examiner

COPIER CONFIGURED TO COPY AN IMAGE AND DATA STORED IN A STORAGE MEDIUM OF AN ORIGINAL DOCUMENT BASED ON SELECTION MODES

CROSS REFERENCE TO RELATED APPLICATION

The present application claims priority from Japanese Patent Application No. 2008-328617, which was filed on Dec. 24, 2008, the disclosure of which is herein incorporated by reference in its entirety.

TECHNICAL FIELD

Apparatuses and devices consistent with the present invention relate to a copier that accesses a storage medium such as an RFID (Radio Frequency Identification) tag. More specifically, the invention relates to a copier having a function of copying an original document (hereinafter, it is referred to as an "RFID document" for convenience of description) to which the storage medium (hereinafter, it is referred to as an "RFID tag" for convenience of description) is attached.

BACKGROUND

It has been studied to use the RFID document in which user information, image information, and the like are stored in the RFID tag. For example, in a related art, as exemplary techniques relating to the copier capable of accessing the RFID tag, there have been disclosed techniques of copying both of an image formed on a sheet and data within the RFID tag attached in the sheet in the RFID document onto the sheet having the RFID tag attached thereto.

SUMMARY

However, the related art copier has the following problem. The copier capable of copying both of the image of the original document and the data of the RFID tag (hereinafter, it is referred to as a "complete copying" for convenience of description) just perform only a complete copying which is previously determined Hence, a degree of freedom in copying process is reduced, and it is difficult to sufficiently reflect a user's intention.

The invention has been made in order to solve the problem of the related art copier. That is, its object is to provide a copier capable of sufficiently reflecting a user's intention with a wide degree of freedom in a copying process.

According to an illustrative aspect of the present invention, there is provided a copier that is configured to copy an image of an original document, which has a storage medium, and the storage medium, wherein a process of copying the original document, which has the storage medium, has three operation modes (A), (B), and (C) of (A) copying the storage medium and the image of the original document, (B) copying only the storage medium, and (C) copying only the image of the original document, and wherein the copier comprises a selection unit that selects an operation mode to be performed among the operation modes.

The copier according to the above aspect of the invention has an operation mode (A) of copying the storage medium and the image of the original document, an operation mode (B) of copying only the storage medium, and an operation mode (C) of copying only the image of the original document. When the original document having the storage medium (for example, an RFID tag) is copied, an operation mode to be performed is selected among these three operation modes (A), (B), and (C). That is, a degree of freedom in copying process is large. With such a configuration, it is possible to perform copying in accordance with a user's intention.

According to the above aspect of the invention, a copier is embodied which is capable of sufficiently reflecting a user's intention with a wide degree of freedom in copying process.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Hereinafter, a print device according to an embodiment of the invention will be described in detail with reference to the accompanying drawings. The embodiment is configured by applying the invention to a multi function peripheral (MFP) capable of accessing an RFID tag and having a function of acquiring data from the RFID tag attached to an original document and copying data recorded in the RFID tag attached into the sheet.

[Entire Configuration of MFP]

Figure 1:
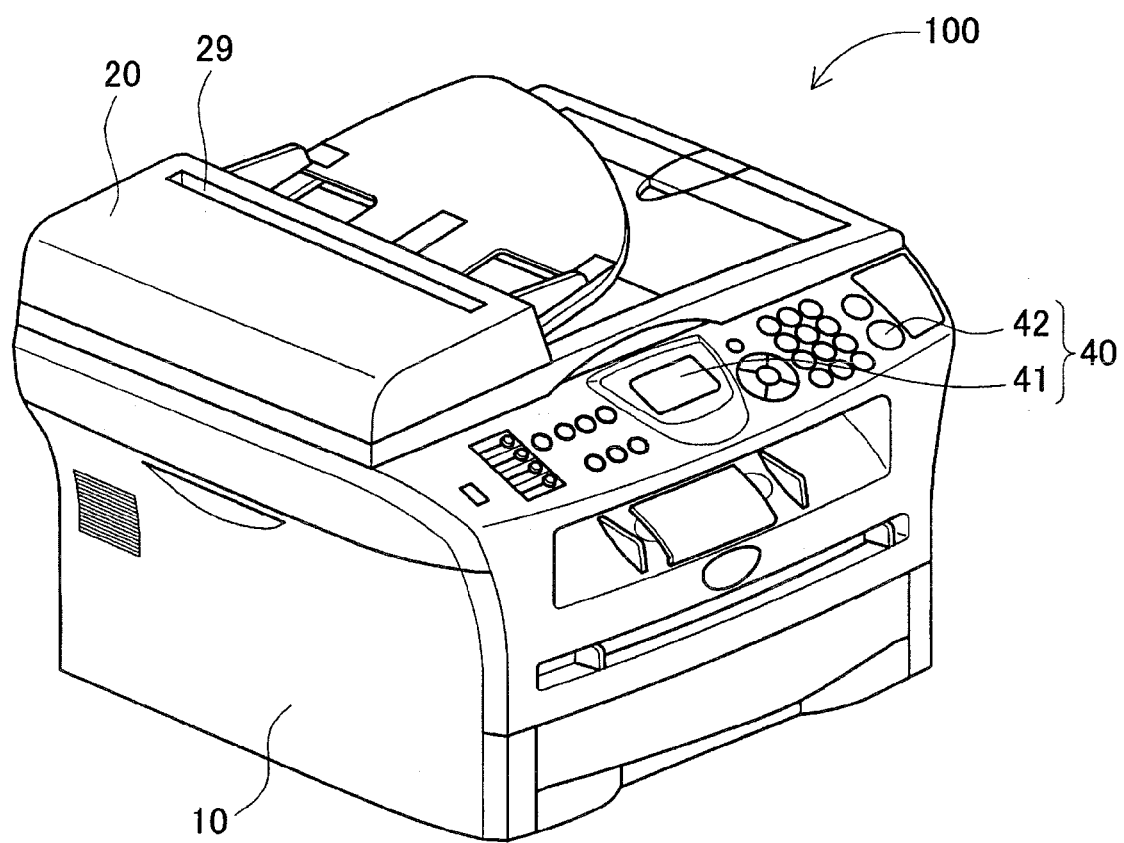
FIG. 1 is a perspective view illustrating a schematic configuration of a multi function peripheral according to an embodiment.

The MFP 100 of the embodiment, as shown in FIG. 1, includes an image forming section 10 for printing an image on a sheet and an image reading section 20 for reading an image of the original document. Further, in the front side of the image reading section 20, there are provided a display section 41 formed of a liquid crystal display and an operational panel 40 having a button group 42 constituted of a start key, a stop key, a numeral keypad, and the like. The operational panel 40 enables display of operation situation and input operation of a user.

[Configuration of Image Reading Section]

Figure 2:
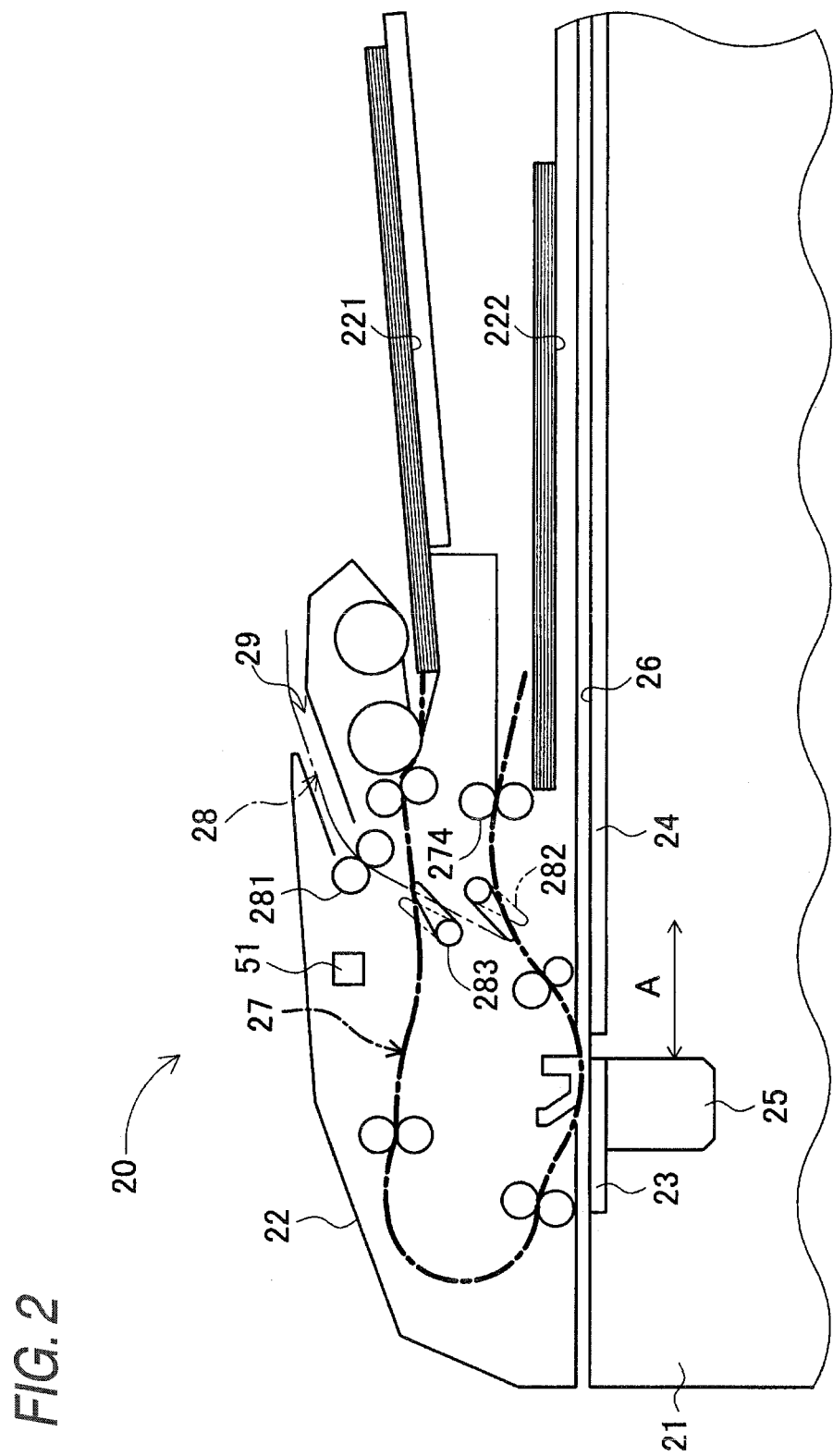
FIG. 2 is a diagram illustrating a schematic configuration of an image reading section of the multi function peripheral according to the embodiment.

The image reading section 20 creates image data by reading the original document. Specifically, the image reading section 20 of the embodiment includes, as shown in FIG. 2, a scanner section 21 for reading the image of the original document and an ADF (Auto Document Feeder) 22 for automatically conveying the original document. The scanner section 21 includes transparent platen glasses 23 and 24 located on the upper surface thereof and an image sensor 25 located therein.

The ADF 22 includes an original document tray 221 (an example of the document placing unit) for placing the original document before the reading and a discharge tray 222 for placing the original document after the reading. Specifically, the original document tray 221 is disposed above the discharge tray 222. In addition, the ADF 22 draws out sheets of the original document placed on the original document tray 221 one by one, and discharges the original document onto the discharge tray 222 after the reading of the original document is performed. Further, the ADF 22 openably covers the upper side of the scanner section 21, and also functions as a document fixing cover for the original document placed on the document placing plate 26 (an example of the document placing unit) including the platen glasses 23 and 24.

Methods of reading the original document include a flatbed (a stationary document scanning) method and an ADF (a moving document scanning) method. In the case of the flatbed method, the sheets of the original document are placed on the platen glass 24 (hereinafter, it is referred to as an "FB glass 24") one by one. In this state, by moving the image sensor 25 in a sub-scanning direction (a direction orthogonal to the main scanning direction, that is, a direction of the arrow A of FIG. 2), at this time, the image of the original document is read line by line in the main scanning direction. On the other hand, in the case of the ADF method, the sheets of the original document are collected and placed on the original document tray 221. Then, the image sensor 25 is moved to a position opposed to the platen glass 23 (hereinafter, it is referred to as an "ADF glass 23"), and is fixed thereto. In this state, the original document is conveyed to the position (a reading position) opposed to the ADF glass 23, and at this time the image of the original document is read line by line in the main scanning direction.

Subsequently, the ADF 22 will be described in detail. Inside the ADF 22, there are provided a conveying path 27 having substantially a U shape which interconnects the original document tray 221 and the discharge tray 222 by means of various rollers. Specifically, the conveying path 27 of the ADF 22 is configured as a path which is stretched from the original document tray 221 to the inside of ADF 22, is curved and looped back through several rollers, and extends to the discharge tray 222 through the upper side of the ADF glass 23. When the original document passes above the ADF glass 23, the image of the original document is read.

Furthermore, the ADF 22 is provided with a double sided reading mechanism for reading the images of both sides of the original document. The conveying path 28 in FIG. 2 is a conveying route for turning over the original document and re-conveying it to the ADF glass 23 so as to read an image of the other side of the original document of which one side's image is read. Further, the casing of the ADF 22 is provided with the slit 29 for sending a part of the original document out of the ADF 22 and turning over the original document.

Specifically, inside the ADF 22, there are provided a switch back roller 281, a first guide flap 282, and a second guide flap 283 which constitute the conveying path 28. That is, the conveying path 28 is a path which extends from the first guide flap 282 through the second guide flap 283 toward the switch back roller 281.

In the double sided reading using the ADF 22, the original document is sent from the original document tray 221, and passes through the various rollers, thereby reading the image of the surface thereof at the reading position. Subsequently, the original document is guided to the conveying path 28 by the first guide flap 282, passes through the second guide flap 283, and is conveyed to the switch back roller 281. Then, at the switch back roller 281, the conveying direction of the original document is reversed. At this time, directions of the first guide flap 282 and second guide flap 283 are reversed. At the second guide flap 283, the original document is conveyed into the conveying path 27 again, and is brought to the reading position, thereby reading the image of the rear side thereof. With such a configuration, the original document is turned over, thereby reading the image of the rear side. After that, the original document passes through the first guide flap 282, and is discharged from the sheet discharging roller 274 to the discharge tray 222.

Further, the ADF 22 includes an R/W device 51 capable of reading and recording the data from and into the RFID tag by detecting the RFID tag which is within a predetermined range. The R/W device 51 is disposed in the range accessible to the RFID tag when the RFID document is placed on the original document tray 221 or the document placing plate 26.

[Configuration of Image Forming Section]

Figure 3:
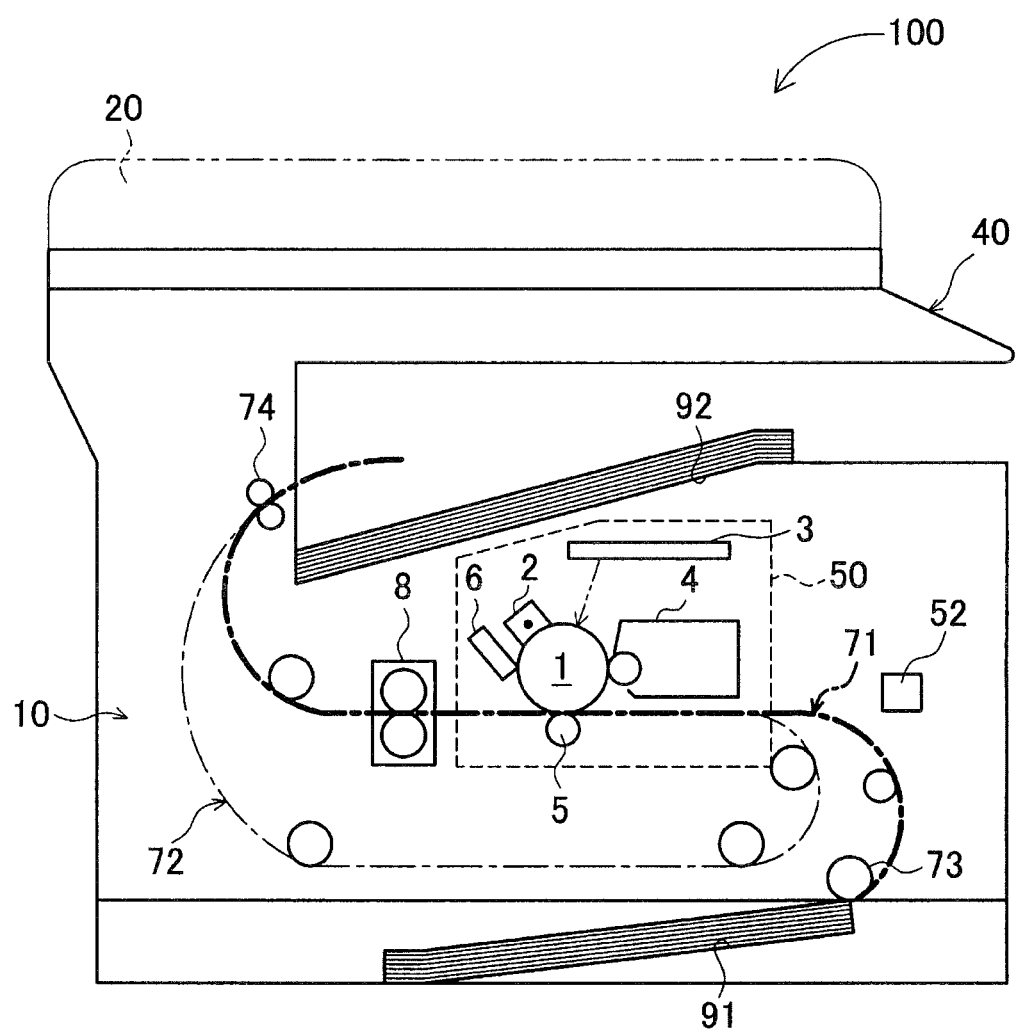
FIG. 3 is a diagram illustrating a schematic configuration of an image forming section of the multi function peripheral according to the embodiment.

The image forming section 10 forms an image on the basis of the image data sent from an information terminal device such as a personal computer (PC) and the image data of the original document read by the image reading section 20, thereby printing the image on the sheet. The image forming section 10 of the embodiment forms an image in a known electrophotogaphic method. As shown in FIG. 3, the image forming section 10 includes a processing section 50 for forming an image, a fixing unit 8 for fixing a toner image which is not fixed, a sheet feeding cassette 91 (an example of the sheet feeding unit) for placing the sheet before the image formation, and a sheet discharging tray 92 for placing the sheet after the image formation.

In the image forming section 10, there is provided a conveying path 71 which is formed in substantially an S shape so that the sheet housed in the sheet feeding cassette 91 located on the bottom portion passes a sheet feeding roller 73, the processing section 50, and the fixing unit 8, and is guided to the sheet discharging tray 92 on the upper side thereof through a sheet discharging roller 74. That is, the image forming section 10 draws out the sheets placed on the sheet feeding cassette 91 one by one, and conveys the sheets to the processing section 50, thereby transferring the toner image formed by the processing section 50 onto the sheet. Furthermore, the image forming section 10 conveys the sheet, on which the toner image is transferred to the fixing unit 8, and heat-fixes the toner image onto the sheet. Then, the sheet after the fixation is discharged to the sheet discharging tray 92.

The processing section 50 includes a photoconductor 1, a charger 2 for uniformly charging the surface of the photoconductor 1, an exposure device 3 for forming an electrostatic latent image by irradiating light on the surface of the photoconductor 1, a development device 4 for performing development, based on the toner, on the electrostatic latent image, a transfer device 5 for transferring the toner image on the photoconductor 1 onto the sheet, and a cleaning blade 6 for removing the toner remaining on the photoconductor 1.

In the processing section 50, the surface of the photoconductor 1 is uniformly charged by the charger 2. Then, by exposing it to light irradiated from the exposure device 3, the electrostatic latent image of the image to be formed on the sheet is formed. Next, the toner is supplied to the photoconductor 1 through the development device 4. With such a configuration, the electrostatic latent image on the photoconductor 1 is visualized as a toner image.

Furthermore, in the image forming section 10, there is provided a duplex printing mechanism for printing both sides of the sheet. The conveying path 72 in FIG. 3, is a conveying path for turning over the sheet and re-conveying it to the processing section 50 so as to print the other side of the sheet of which one side is printed.

In the duplex printing performed by the image forming section 10, the sheet having the image, which is formed on the front surface thereof by passing the sheet through the conveying path 71 as a conveying path (a forward conveying path) for the front surface, is stopped at the sheet discharging roller 74, and the sheet conveying direction is reversed. Then, the sheet is conveyed from the sheet discharging roller 74 to the conveying path 72 as a re-conveying path, passes a position between the processing section 50 and the sheet feeding cassette 91, and is guided into the processing section 50 again. With such a configuration, the sheet is turned over, thereby forming the image on the rear side.

Further, the image forming section 10 includes an R/W device 52 capable of reading and recording the data from and into the RFID tag by detecting the RFID tag which is within a predetermined range. The R/W device 52 is disposed in the range accessible to the RFID tag when the RFID document is placed on the conveying paths 71 and 72.

[Electric Configuration of MFP]

Figure 4:
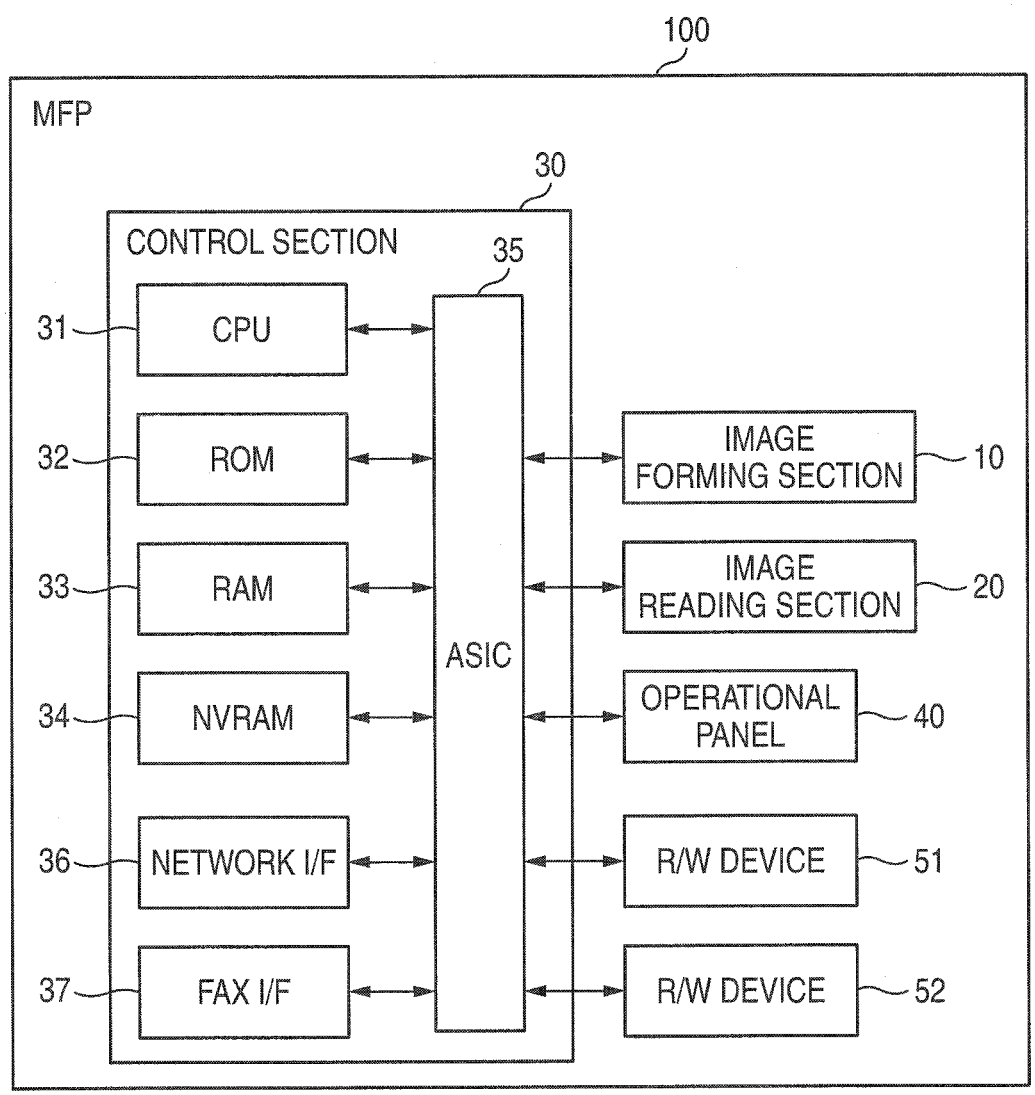
FIG. 4 is a block diagram illustrating an electrical configuration of the multi function peripheral according to the embodiment.

Subsequently, an electric configuration of the MFP 100 will be described. The MFP 100 has, as shown in FIG. 4, a control section 30 including a CPU 31, a ROM 32, a RAM 33, a NVRAM 34, an ASIC 35, a network interface 36, and a FAX interface 37.

The CPU 31 is a main control section which performs calculation for various functions such as an image reading function, an image formation function, and the like in the MFP 100. The ROM 32 stores various control programs for controlling the MFP 100, various settings, initial values, and the like. The RAM 33 is used as a working area for reading the various control programs or a storage area for temporarily storing the image data. The NVRAM (Non Volatile RAM) 34 is storage means with nonvolatility, is used as a storage area for storing the various settings, the image data, and the like.

The CPU 31 stores the process results in the RAM 33 or the NVRAM 34 in accordance with signals sent from various sensors and the control program read from the ROM 32. In addition, the CPU 31 controls, through the ASIC 35, the respective components of the MFP 100 (for example, lighting timing of the exposure device constituting the image forming section 10, driving motors, which are not shown, of various rollers constituting the sheet conveying path, and a motor, which is not shown, for moving the image sensor unit constituting the image reading section 20).

The network interface 36 is connected to a network such as the internet, thereby enabling connection with information process devices such as a PC. The FAX interface 37 is connected to a telephone line, thereby enabling connection with a FAX device of another person. Then, through the network interface 36 and the FAX interface 37, job exchange can be performed.

[Copying Process]

[First Embodiment]

Subsequently, the copying process in the MFP 100 will be described. The MFP 100 has an image copy function (a function of reading the image of the original document and forming the image of the readout image data) of the original document and additionally a data copy function (a function of acquiring the data of the RFID tag and recording the acquired data) of the RFID tag. Then, in the following description, a copying process when instruction to copy the RFID document exists will be described.

Figure 5:
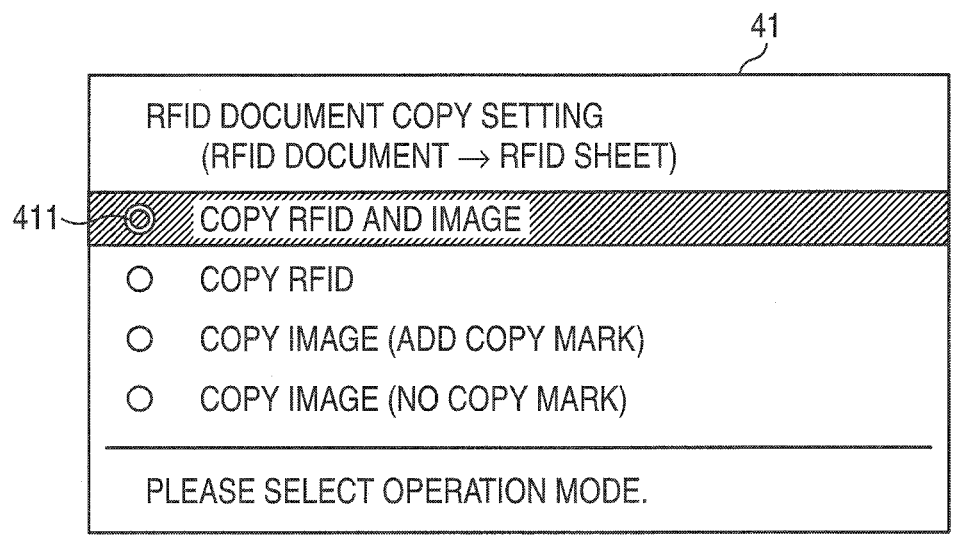
FIG. 5 is a view illustrating an example of a setting screen (a setting A) at the time of copying a RFID document to a RFID sheet.

The MFP 100 has a plurality of operation modes when the process of copying the RFID document is performed. Hence, which operation mode to be operated is set in the MFP 100. In this embodiment, by displaying a setting screen shown in FIG. 5 on the display section 41 of the operational panel 40, a user is prompted to select the operation mode. Then, the user selects one operation mode by use of a radio button 411, thereby setting the operation mode (hereinafter, the setting content set in the setting screen of FIG. 5 is referred to as a "setting A").

Figure 6:
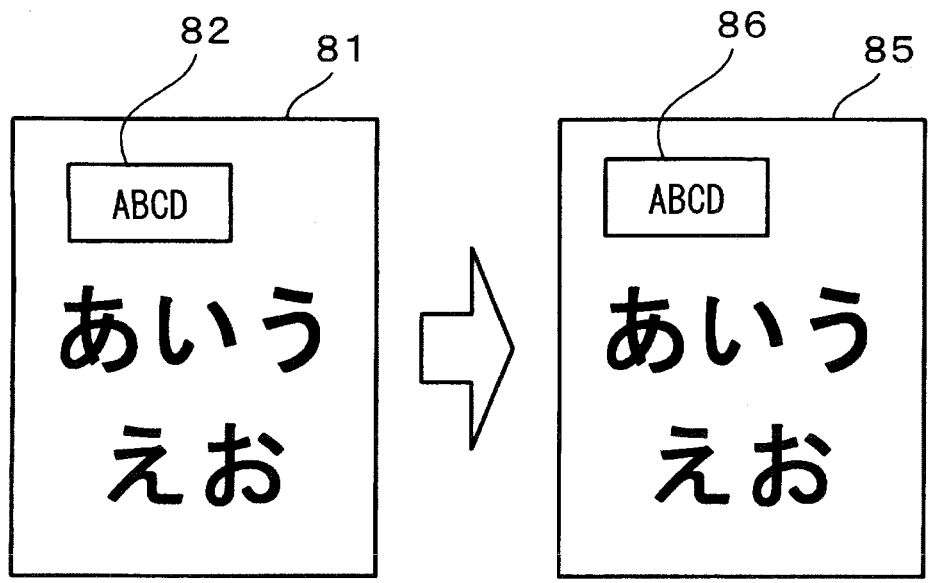
FIG. 6 is a view illustrating an image in an operation mode (an operation mode A) of copying data of an RFID tag and an image of the RFID document to the RFID sheet.

Specifically, in this embodiment, the following four operation modes are selectable. The first operation mode is an operation mode of printing the image of the RFID document on the RFID sheet and copying the data of the RFID tag of the original document to the RFID tag of the sheet (hereinafter, it is referred to as an "operation mode A"). In the operation mode A, as shown in FIG. 6, the image of the RFID document 81 is copied to the RFID sheet 85. In addition, the entire data of the REID tag 82 of the RFID document 81 is copied to the RFID tag 86 of the RFID sheet 85. That is, the operation mode A is an operation mode of performing the complete copying.

Figure 7:
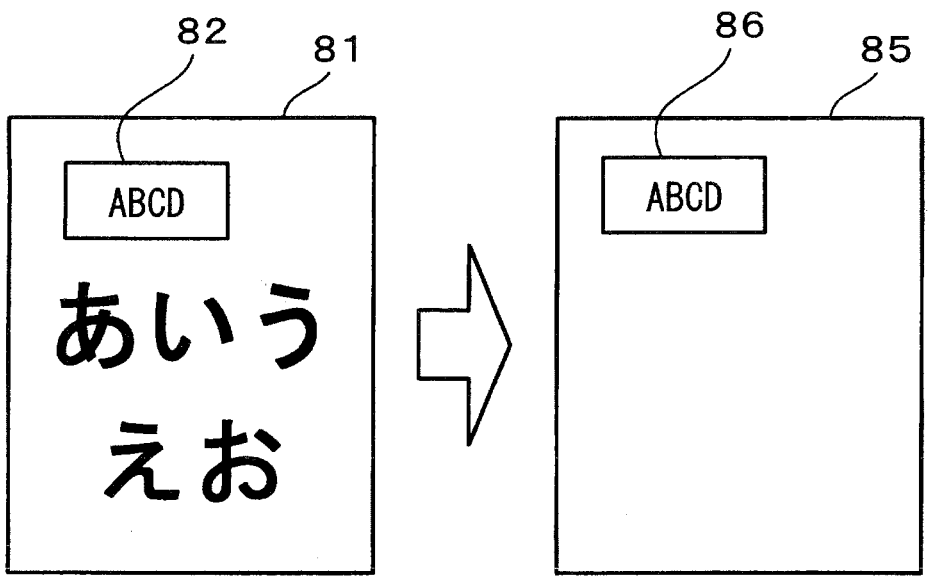
FIG. 7 is a view illustrating an image in an operation mode (an operation mode B) of copying only the data of the RFID tag of the RFID document to the RFID sheet.

The second operation mode is an operation mode of copying the data of the RFID tag of the RFID document to the RFID tag of the RFID sheet without copying the image of the RFID document (hereinafter, it is referred to as an "operation mode B"). In the operation mode B, as shown in FIG. 7, the entire data of the RFID tag 82 of the RFID document 81 is copied to the RFID tag 86 of the RFID sheet 85. In contrast, the image of the RFID document 81 is not copied.

Figure 8:
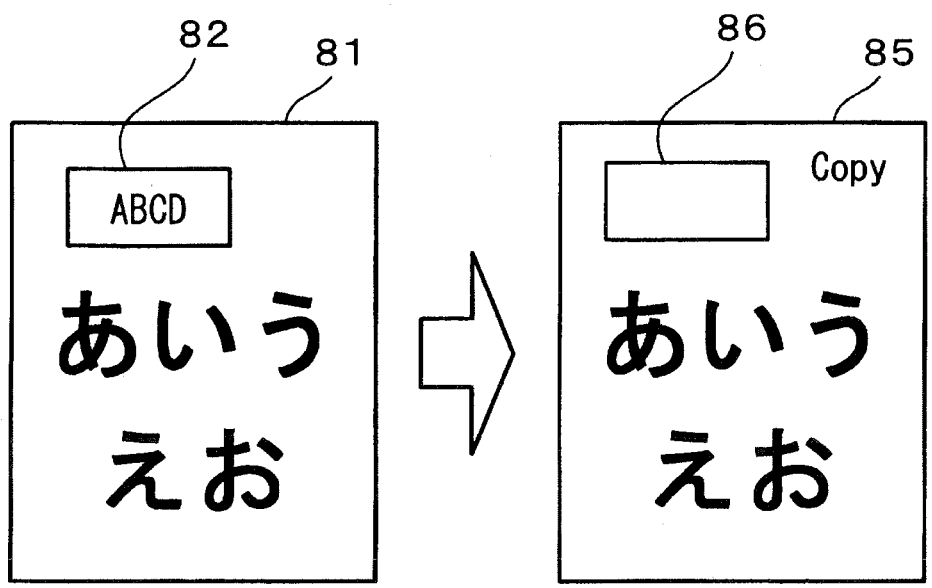
FIG. 8 is a view illustrating an image in an operation mode (an operation mode C1) of copying only the image of the RFID document to the RFID sheet and adding a mark of "Copy"

The third operation mode is an operation of copying the image of the RFID document to the RFID sheet and additionally printing a mark of "Copy" on the RFID sheet without copying the data of the RFID tag of the original document (hereinafter, it is referred to as an "operation mode C1"). In the operation mode C1, as shown in FIG. 8, the image of the RFID document 81 is copied to the RFID sheet 85. In contrast, the data of the RFID tag 82 of the RFID document 81 is not copied. In the embodiment in which the data of the RFID tag 82 is not copied, it is not apparent from an appearance of the RFID sheet 85 whether or not the data is copied. Accordingly, in the operation mode C1, the specific mark (the mark of "Copy" in this embodiment) is printed on the RFID sheet 85. With such a configuration, the user can recognize a duplicate in which only the image is copied (that is, the data of the RFID tag is not copied).

Figure 9:
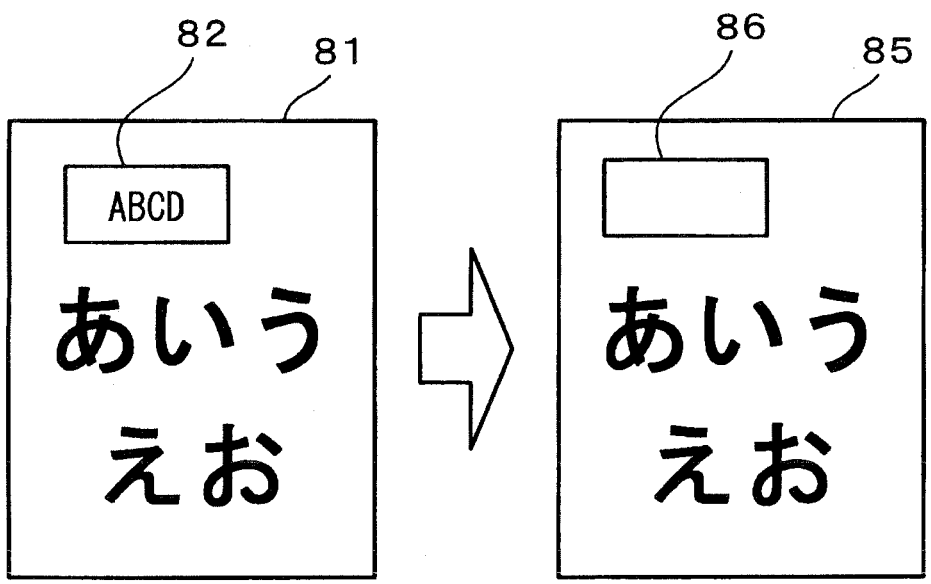
FIG. 9 is a view illustrating an image in an operation mode (an operation mode C2) of copying only the image of the RFID document to the RFID sheet but not adding the mark of "Copy"

The fourth operation mode is an operation mode of copying the image of the RFID document to the RFID sheet without copying the data of the RFID tag of the original document (hereinafter, it is referred to as an "operation mode C2"). In the operation mode C2, as shown in FIG. 9, the image of the RFID document 81 is copied to the RFID sheet 85. In contrast, the data of the RFID tag 82 of the RFID document 81 is not copied. Furthermore, unlike the operation mode C1, the mark of "Copy" is not printed.

The selection result of the user is registered in the MFP 100. That is, the selection result is stored in the NVRAM 34. Then, in the copying process of the MFP 100, the copying operation of the RFID document is performed in accordance with the registered contents. Furthermore, in an initial state, the operation mode A is set as a default mode, and the operation mode A is preferentially selected in a state where the selection of the user does not exist.

Figure 10:
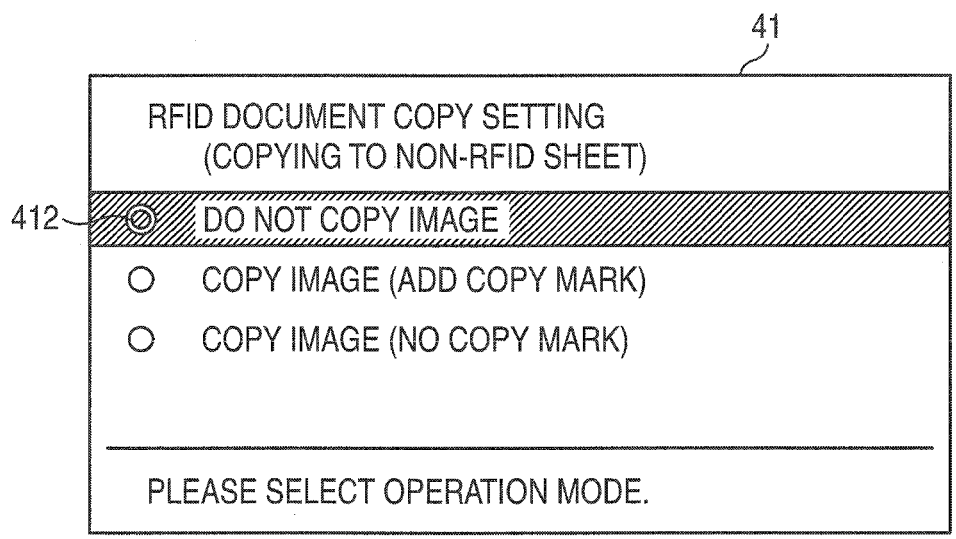
FIG. 10 is a view illustrating an example of a setting screen (a setting B) for setting whether or not to perform copying of the image to the sheet not having the RFID tag at the time of selecting the operation mode C1 or C2.

Further, in the MFP 100, the following three items other than the operation mode are registered. The first item is an item of registering whether or not the image is copied to the sheet (hereinafter, it is referred to as a "non-RFID sheet") to which the RFID tag is not attached when the sheet is fed. Specifically, the MFP 100 has the following three options: do not copy the image; copy the image and attach the mark of "Copy"; and copy the image but do not attach the mark of "Copy". Then, by displaying the setting screen shown in FIG. 10 on the display section 41 of the operational panel 40, the user is prompted to select the option. Then, the user selects one option by use of a radio button 412, thereby setting the operation mode (hereinafter, the setting content set in the setting screen of FIG. 10 is referred to as a "setting B").

Figure 11:
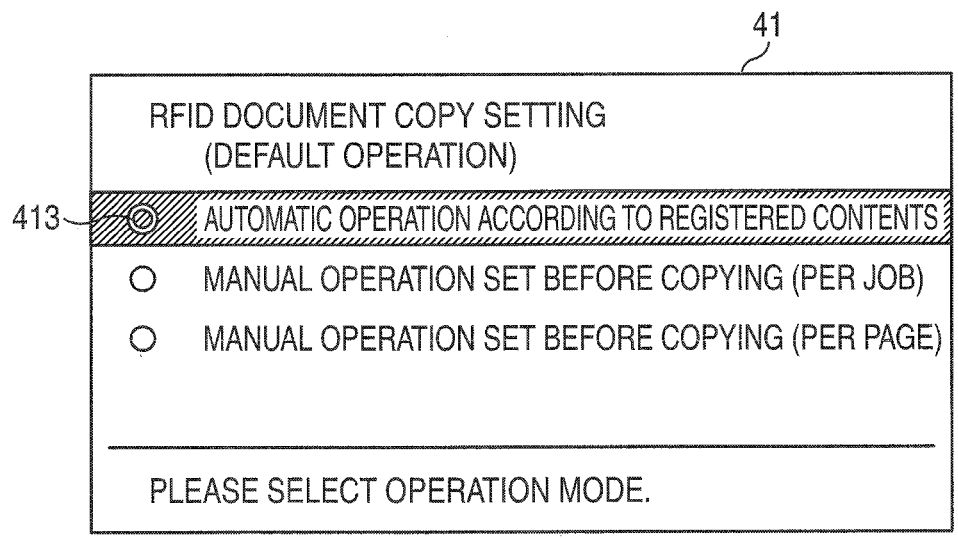
FIG. 11 is a view illustrating an example of a setting screen (a setting C) for setting whether or not to follow a default setting at the time of copying the RFID document to the RFID sheet.

The second item is an item of registering whether the copying (a default copy) is performed in accordance with the registered contents or the copying (a manual copy) is performed by performing the various settings before the copying. In the manual copy, it is registered whether the settings are activated on a per-job basis or is effective on a per-page basis. Specifically, the MFP 100 has the following three options: default copy; manual copy for each job; and manual copy for each page. Then, by displaying the setting screen shown in FIG. 11 on the display section 41 of the operational panel 40, the user is urged to select the operation mode. Then, the user selects one operation mode by use of a radio button 413, thereby setting the operation mode (hereinafter, the setting content set in the setting screen of FIG. 11 is referred to as a "setting C").

Figure 12:
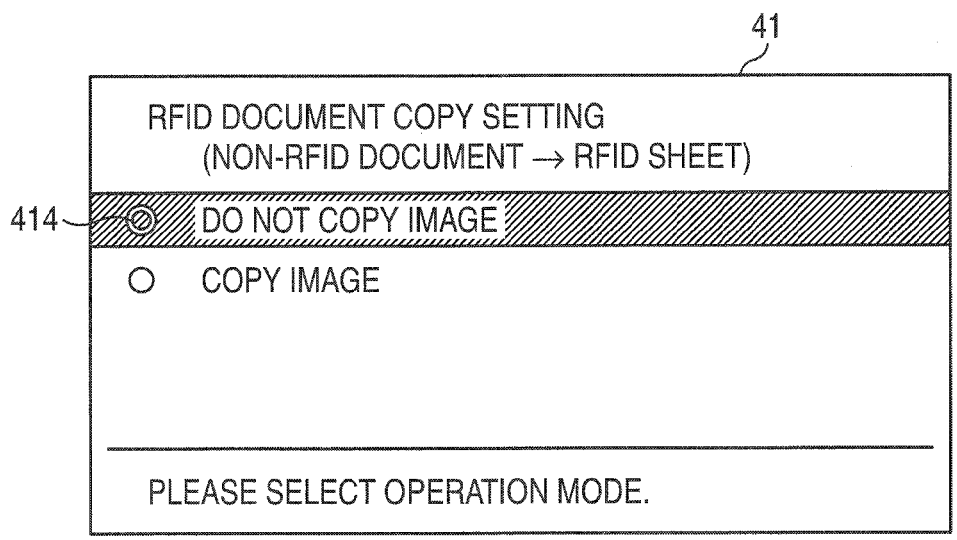
FIG. 12 is a view illustrating an example of a setting screen (a setting D) for setting whether or not to perform the copying the image to the sheet having the RFID tag at the time of copying the image of the non-RFID sheet.

The third item is an item of registering whether the copying is performed on the sheet or the sheet is discharged without the copying of the sheet when the RFID tag is not attached to the original document and the sheet is the RFID sheet. That is, in the copying of the original document (hereinafter, it is referred to as a "non-RFID document") not having the RFID tag, the RFID tag is not necessary, but in such a case, it is selected whether or not high-priced RFID sheet is used. In this embodiment, by displaying the setting screen shown in FIG. 12 on the display section 41 of the operational panel 40, the user is prompted to select the operation mode. Then, the user selects one operation mode by use of a radio button 414, thereby setting the operation mode (hereinafter, the setting content set in the setting screen of FIG. 12 is referred to as a "setting D").

Hereinafter, when the instruction to copy the RFID tag based on a single sided copying exists, the procedure of the copying process (an example of the selection unit and the setting means) will be described with reference to the flowchart of FIG. 13. Furthermore, the process is started by the user's instruction to copy the RFID document.

First, the copy settings registered in the MPF 100 are acquired (S101). Specifically, the contents of the above-mentioned settings A, B, C, and D are acquired. Next, the data of the RFID tag of the original document is read (S102). Then, it is determined whether or not the RFID tag exists in the original document (S103). That is, in step S 102, it is determined that the RFID tag exists when the RFID tag is accessible, or it is determined that the RFID tag does not exist when it is not accessible.

Figure 14:
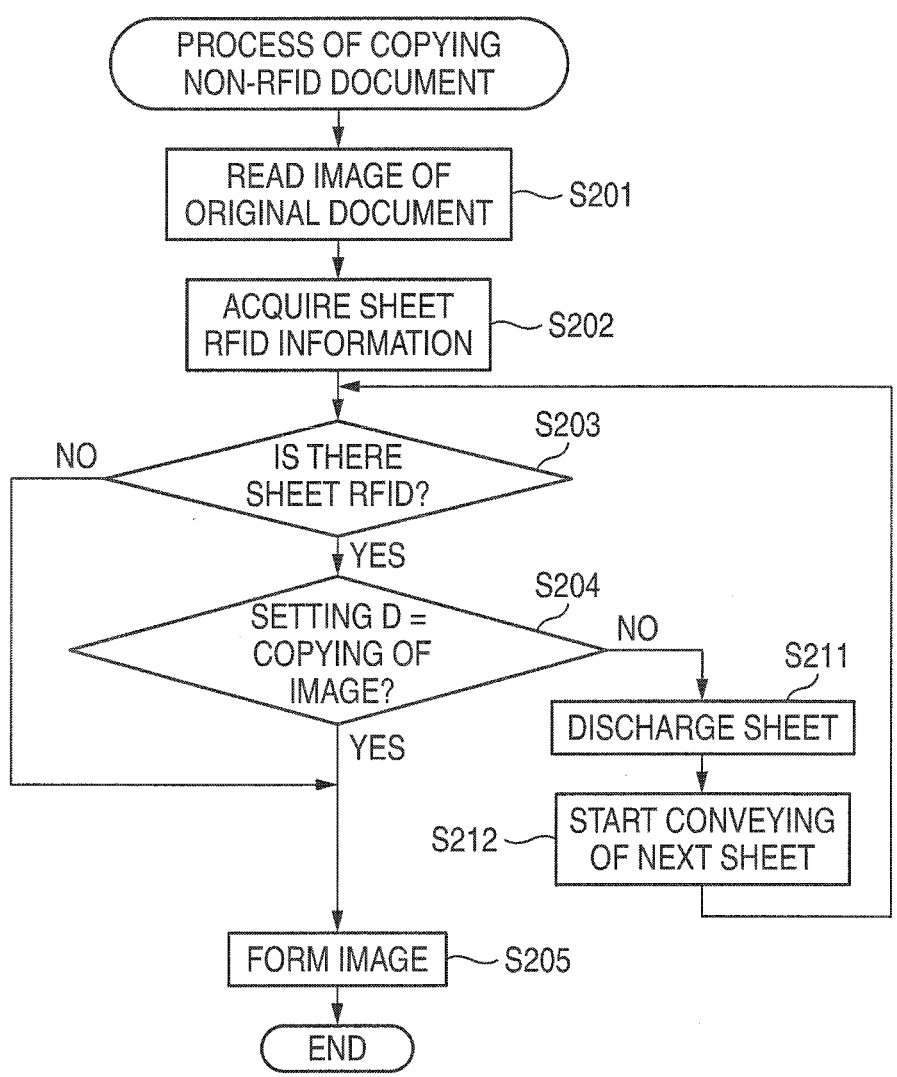
FIG. 14 is a flowchart illustrating a procedure of a process of copying a non-RFID document in the copying process.

If the RFID tag does not exist in the original document (S 103: NO), the flow proceeds to step S 121, and a process of copying the non-RFID document is performed. FIG. 14 is a flowchart illustrating the procedure of the process of copying the non-RFID document in step S 121. First, the image of the original document is read (S201). Then, the sheet is conveyed, and the data of the RFID tag of the sheet is acquired therefrom (S202).

Next, it is determined whether or not the RFID tag exists in the conveyed sheet (S203). That is, in step S202, it is determined that the RFID tag exists when the RFID tag is accessible, or it is determined that the RFID tag does not exist when it is not accessible. If the RFID tag does not exist in the sheet (S203: NO), the image is formed on the non-RFID sheet (S205). In contrast, if the RFID tag exists in the sheet (S203: YES), it is determined whether or not the content of the setting D is "copy the image" (S204). If the content is "copy the image" (S204: YES), the image is formed on the RFID sheet (S205). If the content is "do not copy the image" (S204: NO), the RFID sheet is discharged without the image formation (S211). Then, the conveying of the next recording sheet is started (S212), the flow returns to step S203, and is repeated until the sheet not having the RFID tag is conveyed.

Figure 13:
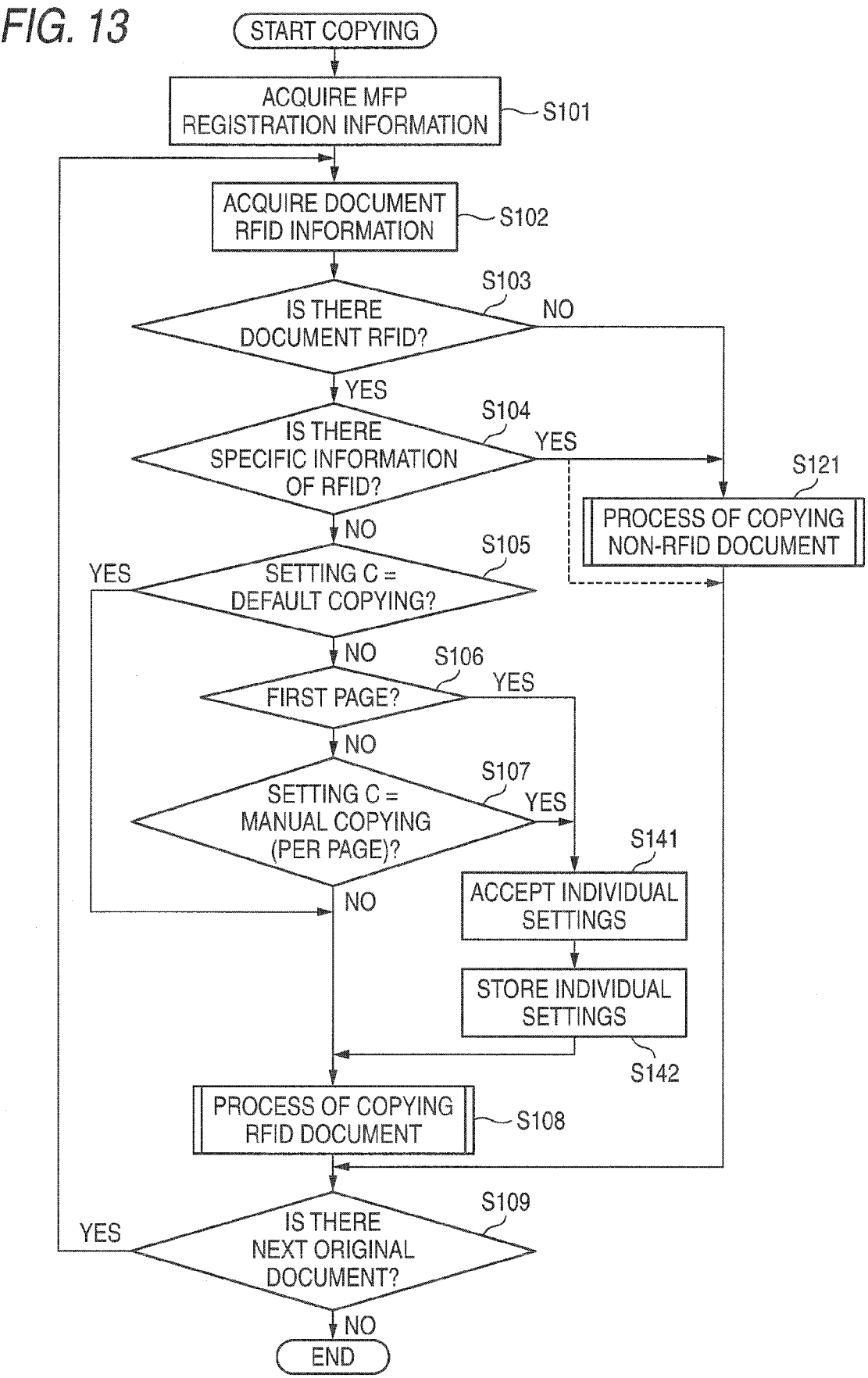
FIG. 13 is a flowchart illustrating a procedure of a copying process (automatic) in a case where the copying of the RFID document is instructed.

Returning to the description of FIG. 13, if the RFID tag exists in the original document (S103: YES), it is determined whether or not the data of the acquired RFID tag includes specific information (S104). In the embodiment, it is determined whether the data of the RFID tag includes information of "prohibition of copying" representing that the copying of the data is not permitted. If the information of "prohibition of copying" is included (S104: YES), the flow proceeds to step S121, and only the image is copied. That is, when the information of "prohibition of copying" is extracted, the process of copying the data of the RFID tag is avoided prior to the settings stored in the MFP 100, and only the copying of the image is performed. With such a configuration, the operation modes are also managed by the instruction from the RFID tag.

Furthermore, in the embodiment, if the information of "prohibition of copying" is included, only the copying of the data of the RFID tag is avoided, but the copying of the image may be also avoided. In this case, step S121 is bypassed as shown in the dotted line of FIG. 13.

In contrast, if the information of "prohibition of copying" is not included (S104: NO), it is determined whether or not the content of the setting C is the default copy (S105). If the content of the setting C is the default copy (S105: YES), the flow proceeds to the process of copying the RFID document in step S108. Consequently, the copying process is performed in accordance with the registered content.

If the content of the setting C is not a default copy (S105: NO), it is determined whether or not the original document corresponds to the first page (S106). If the original document corresponds to the first page (S106: YES), individual copy settings are accepted (S141). Specifically, the setting screens of the above-mentioned settings A and B are displayed one after the other, and both settings are accepted. After the setting of the user, the setting content is stored in the NVRAM 34 (S142), the flow proceeds to the process of copying the RFID document in step S108. Further, if the original document does not correspond to the first page (S106: NO), it is determined whether or not the content of the setting C is the manual copy on a per-page basis (S107). If the content of the setting C is not the manual copying process on the per-page basis (S107: NO), the content of the setting is the manual setting on a per-job basis. Thus the flow proceeds to the process of copying the RFID document in step S108, and the copying is performed in accordance with the setting of the first page stored in step S142. If the content of the setting C is the manual copy on the per-page basis (S107: YES), the flow proceeds to step S141, the next copy setting is performed. Then, after the content of the setting is stored, the flow proceeds to the process of copying the RFID document in step S108.

Figure 15:
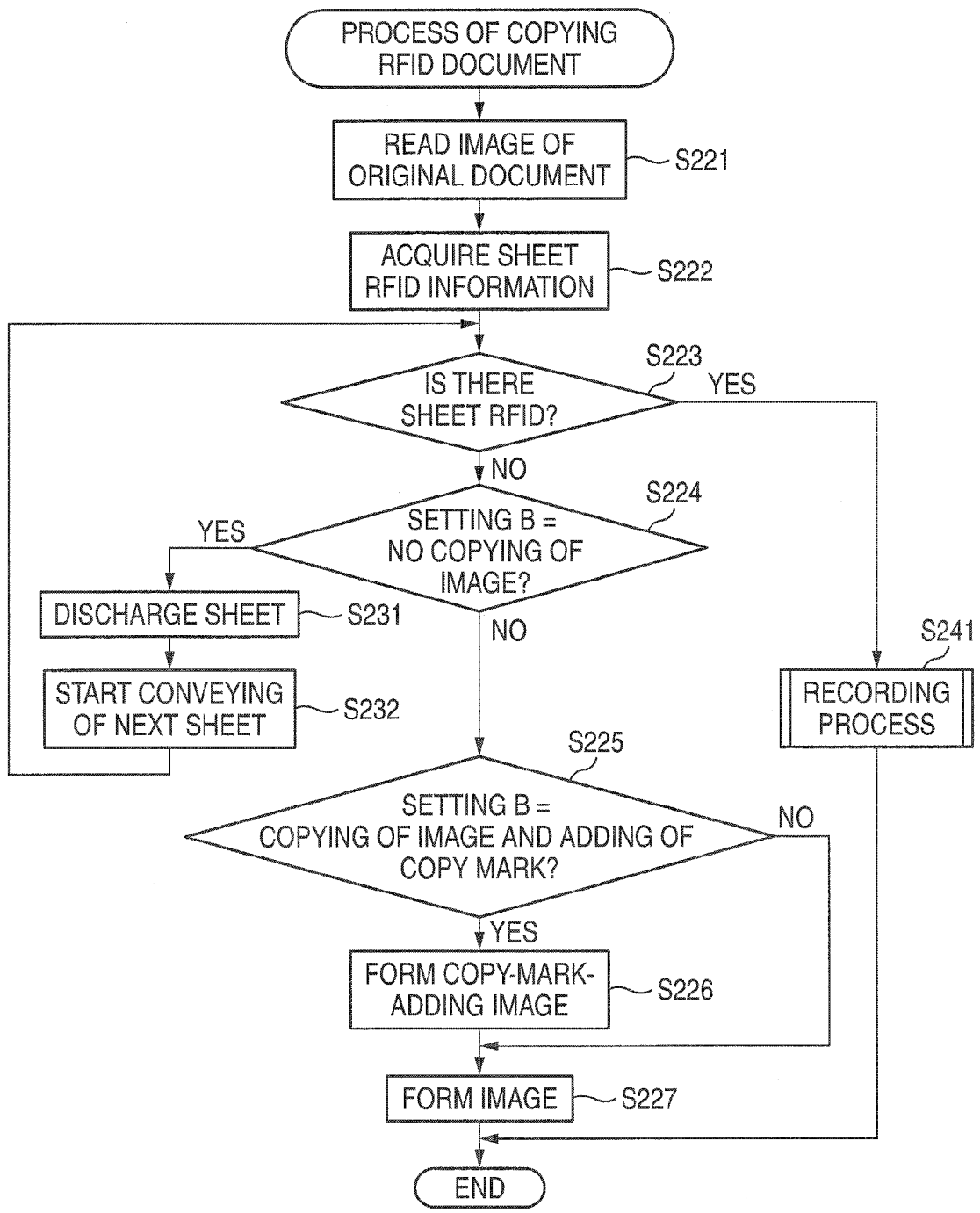
FIG. 15 is a flowchart illustrating a procedure of a process of copying the RFID document in the copying process.

FIG. 15 is a flowchart illustrating a procedure of process of copying the non-RFID document in step S108. First, the image of the original document is read (S221). Then, conveying of the sheet is started (S222). Next, it is determined whether or not the RFID tag exists in the conveyed sheet (S223).

If the RFID tag does not exist (S223: NO), the RFID tag can not be copied. Accordingly, it is determined whether the content of setting B is "do not copy the image" (S224). If the content is "do not copy the image" (S224: YES), the image is not formed on the sheet, and the sheet is discharged (S231). Then, the conveying of the next recording sheet is started (S232), and the flow returns to step S223 and is repeated until the RFID sheet is conveyed.

Unless the content of the setting B is "do not copy the image" (S224: NO), the content of the setting B is "copy the image", and it is determined whether or not the mark of "Copy" is added (S225). If the setting is that the mark of "Copy" is added (S225: YES), an image is created by adding the mark of "Copy" to the image read in step S221 (S226). Then, the image is formed on the sheet (S227). When the setting is that the mark of "Copy" is not added (S225: NO), the image read in step S221 is directly formed on the sheet (S227).

Figure 16:
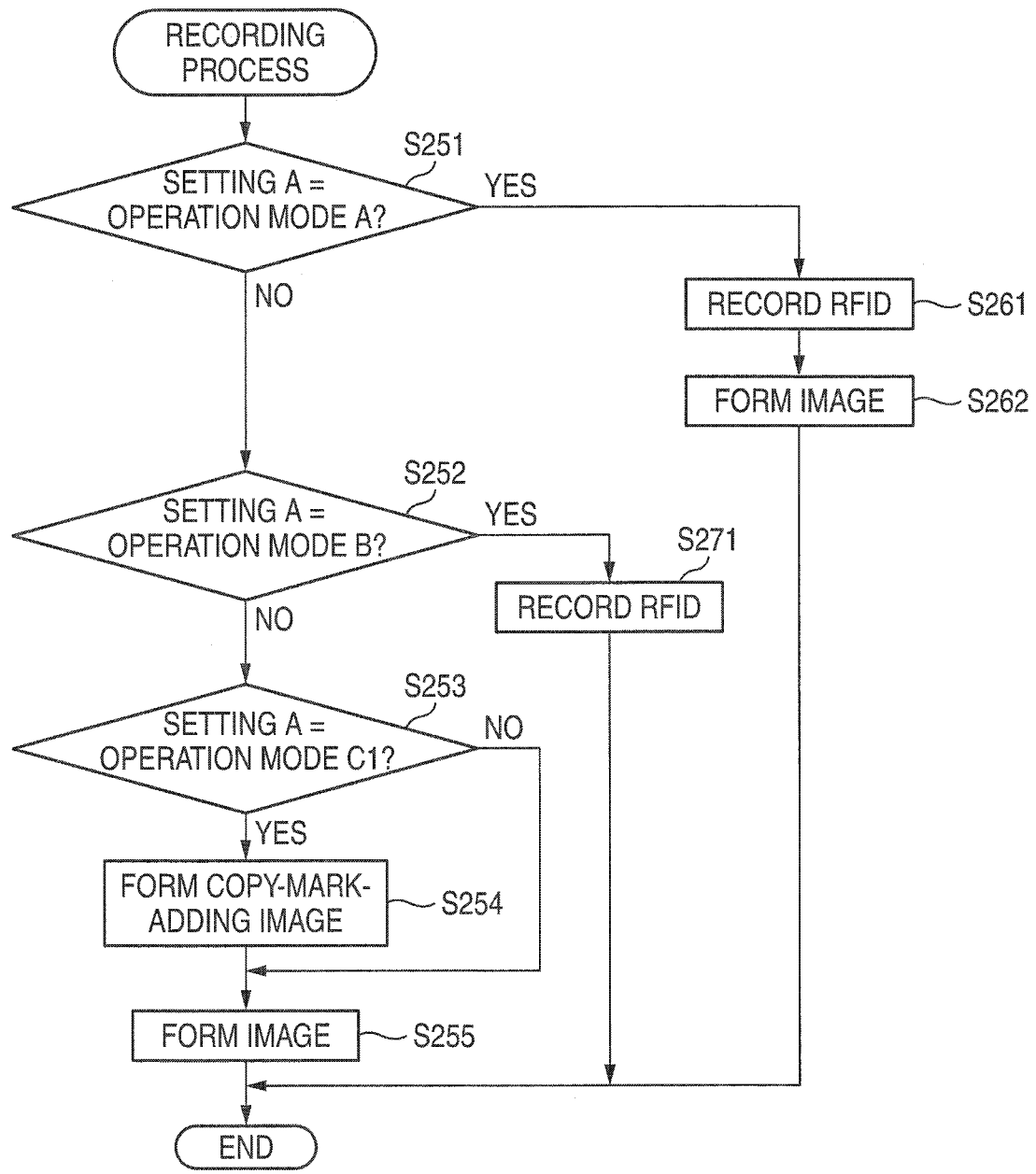
FIG. 16 is a flowchart illustrating a procedure of the recording process in the copying process.

In contrast, if the RFID tag exists in the sheet (S223: YES), the flow proceeds to step S241, and the recording process is performed. FIG. 16 is a flowchart illustrating a procedure of the recording process of step S241. First, it is determined whether or not the setting A is the operation mode A (S251). If the setting A is the operation mode A (S251: YES), the data of the RFID tag acquired in step S102 is recorded in the RFID tag of the sheet (S261), and the image of the original document read in step S221 is additionally formed on the sheet (S262). That is, the complete copying is performed.

If the setting A is not the operation mode A (S251: NO), it is determined whether or not the setting A is the operation mode B (S252). If the setting A is the operation mode B (S252: YES), the data of the RFID tag acquired in step S102 is recorded in the RFID tag of the sheet (S271). That is, only the copying of the RFID tag is performed.

If the setting A is not the operation mode B (S252: NO), it is determined whether or not the setting A is the operation mode C1 (S253). If the setting A is the operation mode C1 (S253: YES), an image is formed by adding the mark of "Copy" to the image read in step S221 (S254). Then, the image is formed on the sheet (S255). If the setting A is not the operation mode C1 (S253: NO), that is, if it is the operation mode C2, the image read in step S221 is directly formed on the sheet (S255).

Returning to the description of FIG. 13, after the process of copying the non-RFID document in step S121, or after the process of copying the RFID document in step S108, it is determined whether or not the next original document exists (S109). For example, by displaying a screen for checking whether or not the next document exists on the display section 41 of the operational panel 40, the existence of the original document is determined by an input from the user on the basis of the screen. If the next original document exists (S109: YES), the flow returns to the process of step S102, and the copying is repeated. If the next original document does not exist (S109: NO), the process is terminated.

[Second Embodiment]

Figure 17:
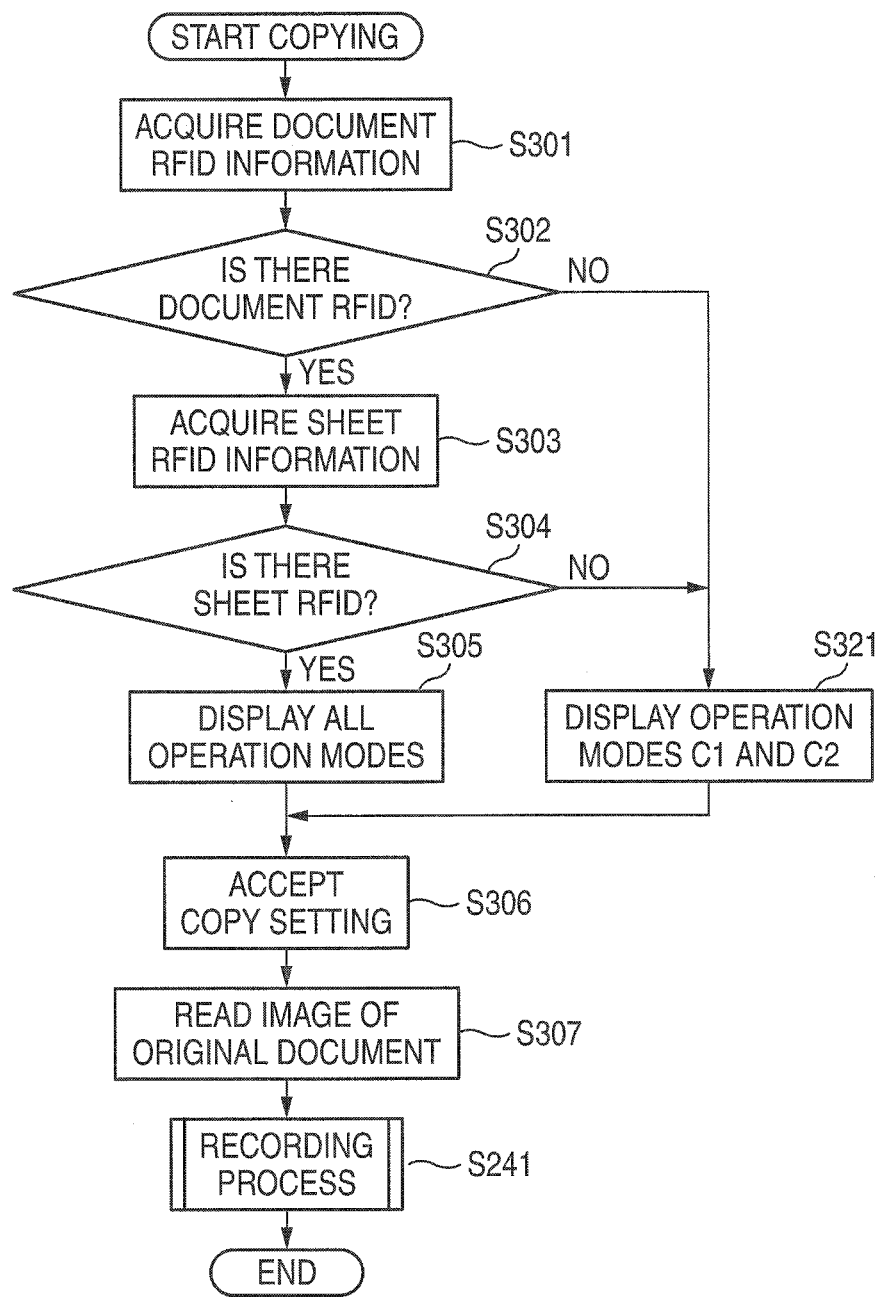
FIG. 17 is a flowchart illustrating a procedure of a copying process (manual) in a case where the copying of the RFID document is instructed.

Subsequently, the copying process (an example of the selection unit, the document determination unit, and the sheet determination unit) of the second embodiment will be described with reference to the flowchart of FIG. 17. In the copying process of the second embodiment, after the copying is instructed, various copy settings are performed. That is, whenever the copying is performed, the copy setting is performed. In this viewpoint, the present embodiment is different from the first embodiment configured so that before the copying is instructed, various copy settings are registered in the MFP 100, and the MFP 100 is operated in accordance with the registered contents. Further, the MFP 100 of the embodiment is provided with an R/W device accessible to the RFID tag located in the sheet feeding cassette 91.

First, it is detected that the original document is placed on the original document tray 221 and the document placing plate 26, and the data of the RFID tag of the original document is read (S301). Next, it is determined whether or not the RFID tag is attached to the original document (S302). That is, it is determined whether or not the RFID tag exists on the original document tray 221 or the document placing plate 26 and the response signal is received from the RFID tag.

If the RFID tag exists in the original document (S302: YES), the data of the RFID tag of the sheet, which is housed in the sheet feeding unit (in the embodiment, the sheet feeding cassette 91) selected as a sheet feeder, is read (S303). Next, it is determined whether or not the RFID tag is attached to the sheet (S304). That is, it is determined whether or not the RFID tag exists in the sheet feeding cassette 91 and the response signal is received from the RFID tag.

If the RFID tag exists in the original document (S304: YES), the setting screen for performing the copying setting is displayed on the display section 41 of the operational panel 40 (S305), and the input of the user is received (S306). Specifically, the user is prompted to set the operation mode by displaying the setting screen shown in FIG. 5. Step S305 is a process performed if both of the original document and the sheet have the RFID tags, and all the above-mentioned four operation modes are selectable. The content of the setting (the setting A) is registered in the MFP 100.

Figure 18:
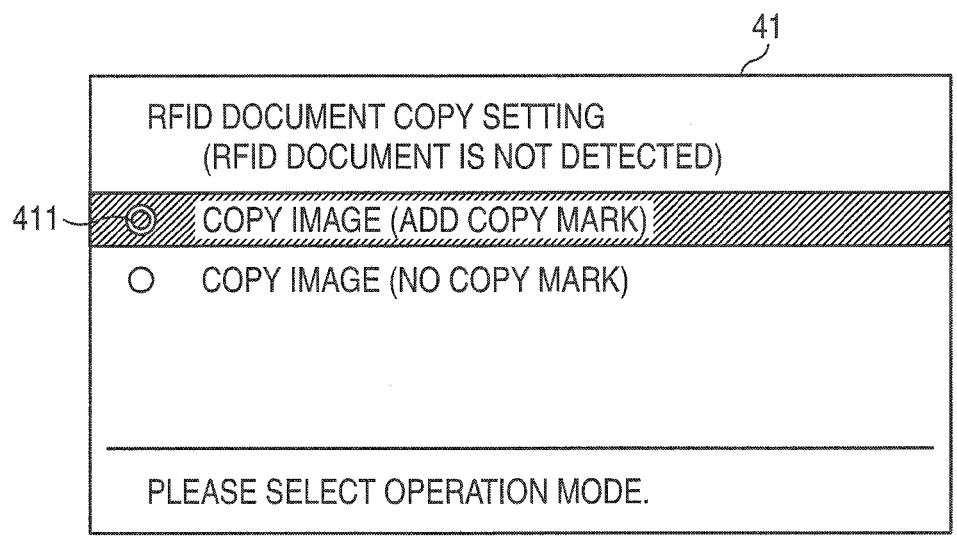
FIG. 18 is a view illustrating an example of a setting screen (the setting A) with options restricted at the time of copying a RFID document to a RFID sheet.

In contrast, if it is determined that at least one of the original document and the sheet do not have the RFID tag (S302: NO or S304: NO), the setting screen, in which the selection of the copying of the RFID tag is restricted, is displayed (S321). Specifically, as shown in FIG. 18, the operation modes A and B of copying the RFID tag are removed from the options of the operation modes, and the setting screen, in which only the operation modes C1 and C2 of not copying the RFID tag are set as options, is displayed. Furthermore, the default option is changed from the operation mode A to the operation mode C1. With such a configuration, it can be avoided that the copying of the RFID tag is instructed despite the original document to which the RFID tag is not attached. Further, it can be avoided that the copying of the RFID tag is instructed although the sheet to which the RFID tag is attached is not provided.

Furthermore, the method of restricting the options of the operation modes is not limited to the method of not displaying the restricted operation modes. For example, by displaying the restricted operation modes as grayed out modes, those may be set to be not selectable.

The setting of the user is accepted, and the content thereof is registered, and subsequently the conveying of the original document is started, and the image of the original document is read (S307). Then, the read information is recorded in the sheet in accordance with the operation mode set in step S306 (S241).

As described above in detail, the MFP 100 has copy operation modes such as the operation mode A of performing the complete copying, the operation mode B of copying only the RFID tag, and the operation modes C1 and C2 of copying only the image. In addition, when the original document having the RFID tag is copied, an operation mode to be performed is selected among these four operation modes A, B, C1, and C2. That is, a degree of freedom in copying process is large. With such a configuration, it is possible to perform copying in accordance with the user's intention.

Furthermore, the embodiment is just an example, and does not limit the invention. Accordingly, it is apparent that various modifications and variations may be made without departing from the technical scope of the invention. For example, the invention is not limited to the multi function peripheral (MFP), and may be applied to a copier and the like which have the function of reading the original document and the function of forming the image. Further, the image formation method of the image forming section is not limited to the electrophotogaphic method, and may be an ink jet method. Further, the image formation method may be a method capable of forming a color image, and may be a method of forming only a black-and-white image.

Further, in the embodiment, the image reading section 20 and the image forming section 10 enables reading and forming of the images of both sides, and the invention is not limited to this. That is, if only reading and forming of the image of the single side are supported, anything can be used.

Further, in the embodiment, it is determined whether or not the RFID sheet is used at the time of copying the image of the non-RFID document (S203). However, the determination as to whether or not the RFID sheet is used is not limited to the copying of the non-RFID document. That is, even when the RFID document is copied, it may be configured to set whether or not the RFID sheet is used in the operation modes C1 and C2 of not performing the copying of the RFID tag. In addition, when the setting is that the RFID sheet is not used, it may be possible to adopt a configuration in which the RFID sheet is discharged and the next sheet is fed.

According to a first aspect of the present invention, there is provided a copier that is configured to copy an image of an original document, which has a storage medium, and the storage medium, wherein a process of copying the original document, which has the storage medium, has three operation modes (A), (B), and (C) of (A) copying the storage medium and the image of the original document, (B) copying only the storage medium, and (C) copying only the image of the original document, and wherein the copier comprises a selection unit that selects an operation mode to be performed among the operation modes.

The copier according to the aspect of the invention has an operation mode (A) of copying the storage medium and the image of the original document, an operation mode (B) of copying only the storage medium, and an operation mode (C) of copying only the image of the original document. When the original document having the storage medium (for example, an RFID tag) is copied, an operation mode to be performed is selected among these three operation modes (A), (B), and (C). That is, a degree of freedom in copying process is large. With such a configuration, it is possible to perform copying in accordance with a user's intention.

According to a second aspect of the present invention, the copier further comprises a document placing unit that is configured to place the original document as an image reading target; and a document determination unit that determines whether or not the original document having the storage medium is placed on the document placing unit, wherein the selection unit restricts the selection of the operation modes (A) and (B) when the document determination unit determines that the original document having the storage medium is not placed thereon. Accordingly, by restricting selection of options of copying the storage medium, it can be expected to reduce difficulty in selection by the user. Further, the selectable operation modes become apparent, and thus it is easy for the user to use the modes.

According to a third aspect of the present invention, the selection unit has default operation modes respectively corresponding to the case where the document determination unit determines that the original document having the storage medium is placed thereon and the case where the document determination unit determines that the original document having the storage medium is not placed thereon. That is, frequently used operation modes may be different in accordance with whether or not the copying of the storage medium is possible. Accordingly, a more preferable operation mode is set as a default mode, thereby improving convenience in use.

According to a fourth aspect of the present invention, the copier further comprises a sheet feeding unit that is configured to house a sheet; and a sheet determination unit that determines whether the sheet having the storage medium is housed in the sheet feeding unit, wherein the selection unit restricts the selection of the operation modes (A) and (B) when the sheet determination unit determines that the sheet having the storage medium is not housed therein even if the document determination unit determines that the original document having the storage medium is placed thereon. That is, with the sheet not having the storage medium, the storage medium cannot be copied. In such a situation, when the user is prompted to select the operation mode (A) or (B), the user is likely to misunderstand that the copying operations of the modes are possible. Accordingly, by restricting the selection of the options of copying the storage medium, it can be expected to reduce difficulty in selection by the user. Further, the selectable operation modes become apparent, and thus it is easy for the user to use the modes.

According to a fifth aspect of the present invention, in the operation mode (C), an image indicating that the copying of the storage medium is not performed is incorporated into the copied image when the sheet has the storage medium. That is, when the data is not copied to the storage medium of the sheet, from the sheet, it is difficult to recognize that the data is not stored in the storage medium. Accordingly, by printing a specific image in accordance with the image of the original document, it is possible to recognize the state of the storage medium. The specific image includes, for example, a string of characters of "no update in tag information" representing that the tag information is not updated, a string of characters of "copy" representing a duplicate (which is not an original), and predetermined marks representing those.

According to a sixth aspect of the present invention, only the copying of the image of the original document is performed when information indicating prohibition of copying is stored in the storage medium of the original document. Further, according to a seventh aspect of the present invention, the processes of copying the storage medium and the image of the original document are not performed when information indicating prohibition of copying is stored in the storage medium of the original document. For example, when information (for example, a string of characters of "for internal use only") representing a high priority is read, only the image is copied, or the copying process itself is avoided. With such a configuration, it can be expected to suppress leakage in information.

According to an eighth aspect of the present invention, the copier further comprises a setting unit that is configured to set whether or not the sheet having the storage medium is used in the process of copying, wherein when the setting unit is set so that the sheet having the storage medium is not used and the sheet having the storage medium is conveyed, the sheet having the storage medium is discharged in a state where the copying of the image is not performed on the sheet. When only the copying of the image is performed (for example, the operation mode (C) and the copying of the original document not having the storage medium), the storage medium is not used. Accordingly, by determining whether or not the sheet having the storage medium is used, it is possible to reduce a frequency in use of the sheet having the storage medium with a relatively high price.

What is claimed is:

1. A copier that is configured to copy an image of an original document having a storage medium to a surface of a sheet, and is configured to copy data stored in the storage medium of the original document to a storage medium of a sheet, the copier comprising:
    a display unit;
    a control unit that is configured to perform
    a process of copying the original document having the storage medium in one of at least three operation modes (A), (B), and (C) of
        (A) copying the data stored in the storage medium of the original document to store the data into the storage medium of the sheet and copying the image of the original document to print the image on a surface of the sheet,
        (B) copying only the data stored in the storage medium of the original document to store the data into the storage medium of the sheet, and
        (C) copying only the image of the original document to print the image on a surface of the sheet,
    a document placing unit that is configured to place the original document thereon as an image reading target; and
    a document determination unit that determines whether or not the original document having the storage medium is placed on the document placing unit,
    wherein the control unit controls the display unit to display a setting screen for selecting an operation mode to be performed from among the at least three operation modes, and wherein the control unit controls the display unit to display the setting screen such that the operation modes (A) and (B) are not selectable when the document determination unit determines that the original document having the storage medium is not placed thereon.

2. The copier according to claim 1,
    wherein the control unit controls the display unit to display the setting screen such that one of the at least three operation modes is set as a default for the case where the document determination unit determines that the original document having the storage medium is placed thereon and another one of the at least three operation modes is set as a default for the case where the document determination unit determines that the original document having the storage medium is not placed thereon.

3. The copier according to claim 1, further comprising:
    a sheet feeding unit that is configured to house a sheet; and
    a sheet determination unit that determines whether the sheet having the storage medium is housed in the sheet feeding unit,
    wherein the control unit controls the display unit to display the setting screen such that the operation modes (A) and (B) are not selectable when the sheet determination unit determines that the sheet having the storage medium is not housed therein even if the document determination unit determines that the original document having the storage medium is placed thereon.

4. The copier according to claim 1,
    wherein the control unit performs the process in the operation mode (C), such that an image indicating that the copying of the data stored in the storage medium is not performed is incorporated into the copied image when a sheet has the storage medium.

5. The copier according to claim 1,
    wherein the control unit performs only the copying of the image of the original document when information indicating prohibition of copying is stored in the storage medium of the original document.

6. The copier according to claim 1,
    wherein the control unit does not perform the processes of copying the data stored in the storage medium and the image of the original document when information indicating prohibition of copying is stored in the storage medium of the original document.

7. The copier according to claim 1, further comprising:
    a setting unit that is configured to set whether or not a sheet having the storage medium is used in the process of copying,
    wherein when the setting unit is set so that the sheet having the storage medium is not used and the sheet having the storage medium is conveyed, the sheet having the storage medium is discharged in a state where the copying of the image is not performed on the sheet.

8. A copier that is configured to copy an image of an original document having a storage medium to a surface of a sheet, and is configured to copy data stored in the storage medium of the original document to a storage medium of a sheet, the copier comprising:
    a display unit;
    a control unit that is configured to perform
    a process of copying the original document having the storage medium in one of at least three operation modes (A), (B), and (C) of
        (A) copying the data stored in the storage medium of the original document to store the data into the storage medium of the sheet and copying the image of the original document to print the image on a surface of the sheet, (B) copying only the data stored in the storage medium of the original document to store the data into the storage medium of the sheet, and (C) copying only the image of the original document to print the image on a surface of the sheet, and wherein the control unit controls the display unit to display a setting screen for selecting an operation mode to be performed from among the at least three operation modes, and wherein the control unit performs the process in the operation mode (C), such that an image indicating that the copying of the data stored in the storage medium is not performed is incorporated into the copied image when a sheet has the storage medium.

9. The copier according to claim 8, further comprising:
a document placing unit that is configured to place the original document thereon as an image reading target; and
a document determination unit that determines whether or not the original document having the storage medium is placed on the document placing unit,
wherein the control unit controls the display unit to display the setting screen such that the operation modes (A) and (B) are not selectable when the document determination unit determines that the original document having the storage medium is not placed thereon, and wherein the control unit controls the display unit to display the setting screen such that one of the at least three operation modes is set as a default for the case where the document determination unit determines that the original document having the storage medium is placed thereon and another one of the at least three operation modes is set as a default for the case where the document determination unit determines that the original document having the storage medium is not placed thereon.

10. The copier according to claim 8, further comprising:
a document placing unit that is configured to place the original document thereon as an image reading target;
a document determination unit that determines whether or not the original document having the storage medium is placed on the document placing unit;
a sheet feeding unit that is configured to house a sheet; and
a sheet determination unit that determines whether the sheet having the storage medium is housed in the sheet feeding unit,
wherein the control unit controls the display unit to display the setting screen such that the operation modes (A) and (B) are not selectable when the document determination unit determines that the original document having the storage medium is not placed thereon, and wherein the control unit controls the display unit to display the setting screen such that the operation modes (A) and (B) are not selectable when the sheet determination unit determines that the sheet having the storage medium is not housed therein even if the document determination unit determines that the original document having the storage medium is placed thereon.

11. The copier according to claim 8,
wherein the control unit performs only the copying of the image of the original document when information indicating prohibition of copying is stored in the storage medium of the original document.

12. The copier according to claim 8,
wherein the control unit does not perform the processes of copying the data stored in the storage medium and the image of the original document when information indicating prohibition of copying is stored in the storage medium of the original document.

13. The copier according to claim 8, further comprising:
a setting unit that is configured to set whether or not a sheet having the storage medium is used in the process of copying,
wherein when the setting unit is set so that the sheet having the storage medium is not used and the sheet having the storage medium is conveyed, the sheet having the storage medium is discharged in a state where the copying of the image is not performed on the sheet.

14. A copier that is configured to copy an image of an original document having a storage medium to a surface of a sheet, and is configured to copy data stored in the storage medium of the original document to a storage medium of a sheet, the copier comprising:
a display unit;
a control unit that is configured to perform
a process of copying the original document having the storage medium in one of at least three operation modes (A), (B), and (C) of
(A) copying the data stored in the storage medium of the original document to store the data into the storage medium of the sheet and copying the image of the original document to print the image on a surface of the sheet,
(B) copying only the data stored in the storage medium of the original document to store the data into the storage medium of the sheet, and
(C) copying only the image of the original document to print the image on a surface of the sheet,
wherein the control unit controls the display unit to display a setting screen for selecting an operation mode to be performed from among the at least three operation modes, and wherein the control unit performs only the copying of the image of the original document when information indicating prohibition of copying is stored in the storage medium of the original document.

15. The copier according to claim 14, further comprising:
a document placing unit that is configured to place the original document thereon as an image reading target; and
a document determination unit that determines whether or not the original document having the storage medium is placed on the document placing unit,
wherein the control unit controls the display unit to display the setting screen such that the operation modes (A) and (B) are not selectable when the document determination unit determines that the original document having the storage medium is not placed thereon, and wherein the control unit controls the display unit to display the setting screen such that one of the at least three operation modes is set as a default for the case where the document determination unit determines that the original document having the storage medium is placed thereon and another one of the at least three operation modes is set as a default for the case where the document determination unit determines that the original document having the storage medium is not placed thereon.

16. The copier according to claim 14, further comprising:
a document placing unit that is configured to place the original document thereon as an image reading target;
a document determination unit that determines whether or not the original document having the storage medium is placed on the document placing unit;
a sheet feeding unit that is configured to house a sheet; and
a sheet determination unit that determines whether the sheet having the storage medium is housed in the sheet feeding unit, wherein the control unit controls the display unit to display the setting screen such that the operation modes (A) and (B) are not selectable when the document determination unit determines that the original document having the storage medium is not placed thereon, and wherein the control unit controls the display unit to display the setting screen such that the operation modes (A) and (B) are not selectable when the sheet determination unit determines that the sheet having the storage medium is not housed therein even if the document determination unit determines that the original document having the storage medium is placed thereon.

17. The copier according to claim 14, further comprising:

a setting unit that is configured to set whether or not a sheet having the storage medium is used in the process of copying, wherein when the setting unit is set so that the sheet having the storage medium is not used and the sheet having the storage medium is conveyed, the sheet having the storage medium is discharged in a state where the copying of the image is not performed on the sheet.

* * * * *